UNITED STATES PATENT OFFICE.

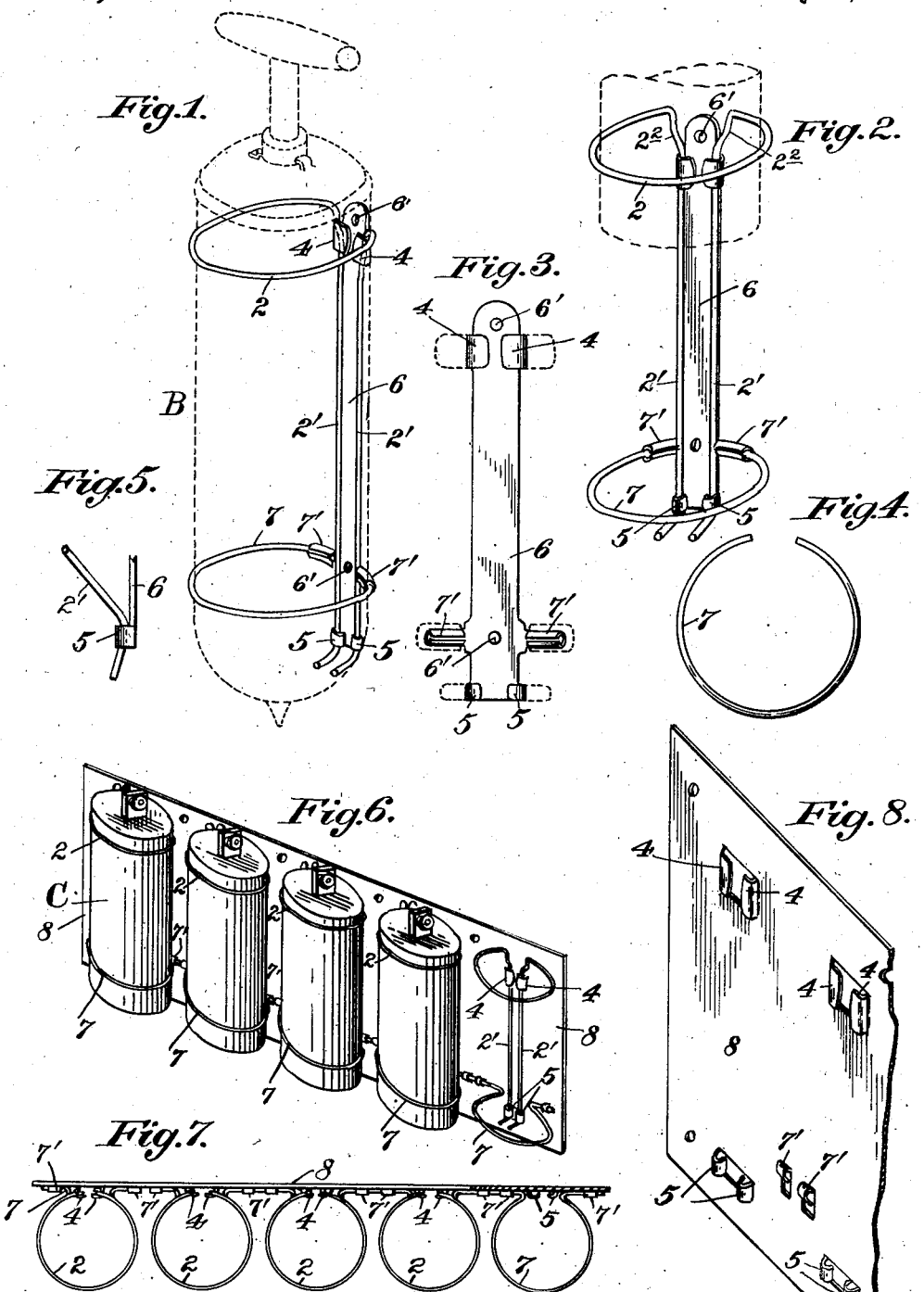

PETER GRAHAM MacGREGOR, OF NEW YORK, N. Y.

CLAMP-SUPPORT.

997,456.   Specification of Letters Patent.   Patented July 11, 1911.

Application filed January 5, 1911. Serial No. 601,017.

*To all whom it may concern:*

Be it known that I, PETER G. MACGREGOR, of the borough of Bronx, city and State of New York, have invented a certain new and useful Improvement in Clamp-Supports, of which the following is a specification.

This invention relates to a device with which a portable object such as a fire extinguishing syringe, a battery cell, etc., may be readily engaged for the purpose of holding the latter rigidly in a desired position. This device is so constructed, moreover, that the object may be instantly disengaged from the support when, for example, it is wanted for immediate use.

The present device embodies as one of its features a clamping part, for instance a ring so mounted that by the force of the inserted object it may be given a limited movement laterally of the plane of the ring, this movement sufficing to contract the ring on and thereby clamp the object; a reverse movement, conversely, serves to release the object and thereby permit its withdrawal.

Another feature of the present device relates to simplicity and cheapness of manufacture.

In the drawing accompanying the present specification, Figure 1 is a perspective view of a clamp support embodying the features of my present improvements, a supported object being indicated in dotted outline. Fig. 2 is a similar view showing the parts in the position assumed when the ring is expanded and ready for the insertion of the object. Fig. 3 is an elevation of the supporting plate of the device, here shown as a stamping with blanked-out portions in dotted outline. Fig. 4 is a plan of the steadying ring. Fig. 5 is a detail showing the manner of engaging the bent ends of the clamping ring extensions with the supporting plate. Fig. 6 is a perspective illustrating the application of the invention to the retention of a plurality of battery cells. Fig. 7 is a plan of the parts as illustrated in Fig. 6. Fig. 8 is an enlarged detail of a portion of the enlarged supporting plate embodied in Figs. 6 and 7.

Similar characters of reference designate corresponding parts in all figures.

This invention includes a clamping member which embodies an expanding and contracting part in juxtaposition to which the body or object to be held may be placed, a shoulder or stop rigid with said member being so related to the object that the latter contacting therewith during the final positioning movement of the object forces the clamping part into positive engagement therewith. The form of this clamping part is adapted to suit the form of the object to be held. It may conveniently consist of a ring where such object is cylindrical. It is here so shown.

Referring to the drawing, 2 designates a ring shaped clamping part conveniently made of wire and which for the purpose of being freed from and of rigidly clamping, as desired, an inserted object, such as a syringe B in Fig. 1 or a battery cell C in Fig. 6, is sufficiently resilient to expand and contract within the necessary limits. This clamping member is so mounted as to be capable of being shifted laterally to the plane of contraction and expansion. The end portions $2^1$, $2^1$, of the wire ring are parallelly extended as indicated, the same being slidably mounted in bearings 4, 4, adjacent to the ring and bearings 5, 5, somewhat removed therefrom.

Between the ring 2 and the parallel portions $2^1$, $2^1$, and connecting the two integrally together are converging portions $2^2$, $2^2$, adapted to enter bearings 4, 4, when the ring is forced downward in Fig. 2 and thereby contract the ring on the inserted object; conversely, when the ring is shifted in the opposite direction, portions $2^2$, $2^2$, passing out of the bearings permit the resilience of the ring to expand the same and thus free the object.

It being contemplated that the forcible depression of the object to the full extent into the ring 2 shall of itself cause the contraction of the latter, there is provided a stop or shoulder on portions $2^1$, $2^1$, adapted to contact with the inserted object and thereby during the final movement of the object cause the parts to move lengthwise in their bearings. As here indicated these stops consist of the laterally bent ends $2^4$, $2^4$, of the portions $2^1$, $2^1$. It is evident, furthermore, that when the clamped object is grasped and forcibly pulled upward in Fig. 1, ring 2 is carried with it some distance until the portions $2^2$, $2^2$, passing out of their bearings permit the ring to resiliently expand and thus automatically release the object.

Bearings 4, 4, 5, 5, are usually rigid with a suitable supporting plate, as a wall or base plate. They may be struck up from a sheet metal blank. This is the construction here illustrated in which a stamped plate 6 is struck up with projecting ears (these being indicated in dotted outline) these latter being bent over to form the bearings specified and the plate having holes $6^1$ for its attachment. Probably also where an elongated cylinder is to be held, as is the case here, an encircling steadying ring 7 is also provided for the end of the object opposite to that with which the contracting ring engages. The ends of this ring may be pinched between the bent over ears $7^1$, $7^1$, of plate 6.

The invention may be obviously applied to the support of a number of objects on the same plate, as for instance the separate cells C of a battery. This is illustrated in Figs. 6, 7 and 8 in which 8 designates the plate from the material of which the various bearings are struck up as before. Like parts in these figures being given the same characters of reference as in the figures already described, further detail description is deemed unnecessary.

Having described my invention, I claim:—

1. In a clamp support, the combination of a clamping ring, parallelly disposed projections extending laterally to the plane of the ring, converging portions connecting the ring with said projections, bearings in which said converging portions are slidably mounted and which operate to open and close the ring during the sliding movement of said portions therein and bearings in which said parallelly disposed projections are slidably mounted.

2. In a clamp support, the combination of a clamping ring, parallelly disposed projections extending laterally to the plane of the ring, converging portions connecting the ring with said projections, bearings in which said converging portions are slidably mounted and which operate to open and close the ring during the sliding movement of said portions therein, stops extending from said projections and bearings contiguous to said stops in which said parallelly disposed projections are slidably mounted.

3. In a clamp support, the combination of a clamping ring, parallelly disposed projections extending laterally to the plane of the ring, converging portions connecting the ring with said projections, bearings in which said projections are slidably mounted and which operate to open and close the ring during the sliding movement of the projections therein, a stop extending from said projections, and a steadying ring for the opposite end of the object to that with which the clamping ring engages.

4. In a clamp support, the combination of a clamping ring, parallelly disposed projections extending laterally to the plane of the ring, converging portions connecting the ring with said projections, bearings in which said projections are slidably mounted and which operate to open and close the ring during the sliding movement of the projections therein, a stop extending from said projections, a steadying ring, and a sheet metal supporting plate to which said steadying ring is secured and from which said bearings are struck up.

5. In a clamp support, the combination of a plurality of clamping rings, a mounting for each ring embracing a pair of parallelly disposed laterally extending projections integrally connected to the ring by angularly disposed portions, stops formed by the bent ends of said projections, a sheet metal supporting plate, bearings struck up from said plate and in which said projections are slidably mounted and which operate to open and close the ring during the sliding movement of the projections therein, and steadying rings secured to said plate and corresponding in number to the number of clamping rings.

In testimony whereof I have signed this specification in the presence of two subscribing witnesses.

PETER GRAHAM MacGREGOR.

Witnesses:
   B. B. ZIPPUT,
   R. W. PITTMAN.